(12) United States Patent
Ji

(10) Patent No.: US 12,513,720 B2
(45) Date of Patent: Dec. 30, 2025

(54) METHOD FOR CAPABILITY AND RESOURCE ALLOCATION, TERMINAL DEVICE, AND CONTROL DEVICE

(71) Applicant: VIVO MOBILE COMMUNICATION CO., LTD., Guangdong (CN)

(72) Inventor: Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 355 days.

(21) Appl. No.: 17/212,932

(22) Filed: Mar. 25, 2021

(65) Prior Publication Data

US 2021/0212053 A1 Jul. 8, 2021

Related U.S. Application Data

(63) Continuation of application No. PCT/CN2019/107760, filed on Sep. 25, 2019.

(30) Foreign Application Priority Data

Sep. 27, 2018 (CN) .......................... 201811133475.2

(51) Int. Cl.
*H04W 72/51* (2023.01)
*H04W 28/24* (2009.01)
*H04W 72/20* (2023.01)
*H04W 76/10* (2018.01)

(52) U.S. Cl.
CPC ........... *H04W 72/51* (2023.01); *H04W 28/24* (2013.01); *H04W 72/20* (2023.01); *H04W 76/10* (2018.02)

(58) Field of Classification Search
CPC ..... H04W 72/51; H04W 28/24; H04W 72/20; H04W 76/10; H04W 8/24; H04W 92/18; H04W 76/14; H04W 4/70; H04L 1/1896; H04L 1/1887; H04L 1/1822
See application file for complete search history.

(56) References Cited

U.S. PATENT DOCUMENTS

| 2016/0050698 | A1 | 2/2016 | Siomina |
| 2016/0219634 | A1 | 7/2016 | Lu et al. |
| 2016/0338094 | A1* | 11/2016 | Faurie .................. H04W 72/04 |

(Continued)

FOREIGN PATENT DOCUMENTS

| CN | 105282681 A | 1/2016 |
| CN | 105681439 A | 6/2016 |

(Continued)

OTHER PUBLICATIONS

CN Office Action in Application No. 201811133475.2 dated May 18, 2021.

(Continued)

*Primary Examiner* — Jay P Patel
*Assistant Examiner* — Shehab A Alawdi
(74) *Attorney, Agent, or Firm* — Price Heneveld LLP

(57) ABSTRACT

This disclosure provides a method for capability and resource allocation for a sidelink, a terminal device, and a control device. The method includes: obtaining information related to sidelink transmission, where the related information includes information about maximum processing capabilities and/or information about maximum allocable resources of a terminal device; and performing transmission configuration.

19 Claims, 3 Drawing Sheets

(56) References Cited

U.S. PATENT DOCUMENTS

| | | | |
|---|---|---|---|
| 2016/0338095 A1* | 11/2016 | Faurie | H04W 72/20 |
| 2016/0353501 A1 | 12/2016 | Huang | |
| 2017/0150491 A1 | 5/2017 | Lin et al. | |
| 2017/0238260 A1 | 8/2017 | Kim et al. | |
| 2017/0273055 A1 | 9/2017 | Xu et al. | |
| 2017/0331577 A1* | 11/2017 | Parkvall | H04L 65/1023 |
| 2017/0331670 A1* | 11/2017 | Parkvall | H04W 52/028 |
| 2017/0367032 A1 | 12/2017 | Luo et al. | |
| 2018/0092067 A1 | 3/2018 | Liu et al. | |
| 2018/0098323 A1 | 4/2018 | Zhang et al. | |
| 2018/0139724 A1 | 5/2018 | Loehr et al. | |
| 2018/0206260 A1* | 7/2018 | Khoryaev | H04W 72/56 |
| 2018/0263026 A1 | 9/2018 | Loehr et al. | |
| 2018/0332585 A1* | 11/2018 | Faurie | H04W 72/0453 |
| 2018/0376474 A1* | 12/2018 | Khoryaev | H04L 1/0007 |
| 2019/0007930 A1* | 1/2019 | Zhao | H04W 72/21 |
| 2019/0045485 A1 | 2/2019 | Seo et al. | |
| 2019/0069200 A1 | 2/2019 | Zhang et al. | |
| 2019/0223066 A1* | 7/2019 | Xu | H04W 36/0058 |
| 2019/0357033 A1* | 11/2019 | Cheng | H04W 16/02 |
| 2019/0363843 A1* | 11/2019 | Gordaychik | H04L 1/08 |
| 2020/0015068 A1 | 1/2020 | Feng | |
| 2020/0068593 A1 | 2/2020 | Seo | |
| 2020/0100088 A1* | 3/2020 | Kim | H04W 48/16 |
| 2020/0344726 A1 | 10/2020 | Seo et al. | |
| 2021/0185703 A1 | 6/2021 | Seo | |

FOREIGN PATENT DOCUMENTS

| | | |
|---|---|---|
| CN | 106303909 A | 1/2017 |
| CN | 106793090 A | 5/2017 |
| CN | 107277922 A | 10/2017 |
| CN | 107371182 A | 11/2017 |
| CN | 107580340 A | 1/2018 |
| CN | 108432309 A | 8/2018 |
| JP | 2017518005 A | 6/2017 |
| JP | 2017522786 A | 8/2017 |
| JP | 2017524304 A | 8/2017 |
| JP | 2017524305 A | 8/2017 |
| JP | 2017-528067 A | 9/2017 |
| JP | 2018-512009 A | 4/2018 |
| WO | 2015/110990 A1 | 7/2015 |
| WO | 2015152797 A1 | 10/2015 |
| WO | 2017057952 A1 | 4/2017 |
| WO | 2017/166021 A1 | 10/2017 |
| WO | 2018084556 A1 | 5/2018 |

OTHER PUBLICATIONS

CN Search Report in Application No. 201811133475.2 dated Mar. 2, 2021.
"On support of sidelink unicast, groupcast and broadcast" 3GPP TSH RAN WG1 Meeting #94, Xiaomi Communications, R1-1809174, Aug. 20, 2018.
"On resource allocation for NR V2x sidelink communications" 3GPP TSG RAN WG1 Meeting #94, Xiaomi, R1-1809178, Aug. 20, 2018.
"New SID: Study on NR V2x" 3GPP TSG RAN Meeting #80, Vodafone, FP-1814299, Jun. 11, 2018.
Written Opinion and International Search Report in Application No. PCT/CN2019/107760 dated Apr. 8, 2021.
JP Office Action dated Jul. 21, 2023 as received in Application No. 2021-517376.
JP Office Action in Application No. 2021-517376 Dated May 31, 2022.
"Support of unicast, groupcast and broadcast in NR sidelink" 3GPP TSG RAN1 Meeting #94, CATT, R1-1808399, Aug. 20, 2018.
"Support of unicast, groupcast and broadcast" 3GPP TSG RAN WG1 Meeting #94bis, vivo, R1-1810388, Oct. 8, 2018.
EP Search Report in Application No. 19866190.2 dated Nov. 8, 2021.
JP Office Action in Application No. 2021-517376 Dated Dec. 27, 2022.
SG Office Action in Application No. 11202103175U Dated Jan. 10, 2023.

* cited by examiner

METHOD FOR CAPABILITY AND RESOURCE ALLOCATION, TERMINAL DEVICE, AND CONTROL DEVICE

CROSS-REFERENCE TO RELATED APPLICATIONS

This application is a continuation application of International Application No. PCT/CN2019/107760 filed on Sep. 25, 2019, which claims priority to Chinese Patent Application No. 201811133475.2, filed in China on Sep. 27, 2018, both disclosures of which are incorporated herein by reference in their entireties.

TECHNICAL FIELD

Embodiments of this disclosure relate to the communications field, and in particular, to a method for capability and resource allocation for a sidelink (SideLink, SL), a terminal device, and a control device.

BACKGROUND

A long term evolution (Long Term Evolution, LTE) system supports sidelink transmission, that is, data transmission between terminal devices can be directly performed on a physical layer. In an LTE SL, communication is performed based on broadcast. Although the LTE SL may be used to support basic security communication of vehicle to everything (vehicle to everything, V2X), the LTE SL is not applicable to other more advanced V2X services.

A new radio (New Radio, NR) system supports more advanced SL transmission designs, such as unicast, multicast, or groupcast, and therefore can support more comprehensive service types. In an NR SL system, if a terminal device supports establishment of SL connections to a plurality of peer devices, however, the related art does not provide solutions related to capability and resource allocation for SL transmission.

SUMMARY

According to a first aspect, a method for capability and resource allocation for a sidelink is provided, where the method is performed by a terminal device and the method includes: obtaining information related to sidelink transmission, where the related information includes information about maximum processing capabilities and/or information about maximum allocable resources of the terminal device; and performing transmission configuration.

According to a second aspect, a method for capability and resource allocation for a sidelink is provided, where the method is performed by a control device and the method includes: receiving information related to sidelink transmission, where the related information includes information about maximum processing capabilities and/or information about maximum allocable resources of a terminal device; and performing transmission configuration or scheduling for the terminal device.

According to a third aspect, a terminal device is provided and includes: an obtaining module, configured to obtain information related to sidelink transmission, where the related information includes information about maximum processing capabilities and/or information about maximum allocable resources of the terminal device; and a transmission configuration module, configured to perform transmission configuration.

According to a fourth aspect, a control device is provided and includes: a receiving module, configured to receive information related to sidelink transmission, where the related information includes information about maximum processing capabilities and/or information about maximum allocable resources of a terminal device; and a transmission configuration module, configured to perform transmission configuration or scheduling for the terminal device.

According to a fifth aspect, a terminal device is provided, where the terminal device includes a memory, a processor, and a program stored in the memory and capable of running on the processor, where when the program is executed by the processor, steps of the method for capability and resource allocation for a sidelink according to the first aspect are implemented.

According to a sixth aspect, a control device is provided, where the control device includes a processor, a memory, and a program stored in the memory and capable of running on the processor, where when the program is executed by the processor, steps of the method for capability and resource allocation for a sidelink according to the second aspect are implemented.

According to a seventh aspect, a computer-readable storage medium is provided, where the computer-readable storage medium stores a program, and when the program is executed by a processor, steps of the method for capability and resource allocation for a sidelink according to the first aspect or the second aspect are implemented.

BRIEF DESCRIPTION OF DRAWINGS

The drawings described herein are used to provide a further understanding about this disclosure, and constitute a part of this disclosure. Example embodiments of this disclosure and descriptions thereof are used to explain this disclosure, but do not constitute any inappropriate limitation on this disclosure. In the drawings.

DESCRIPTION OF EMBODIMENTS

Figure 1:
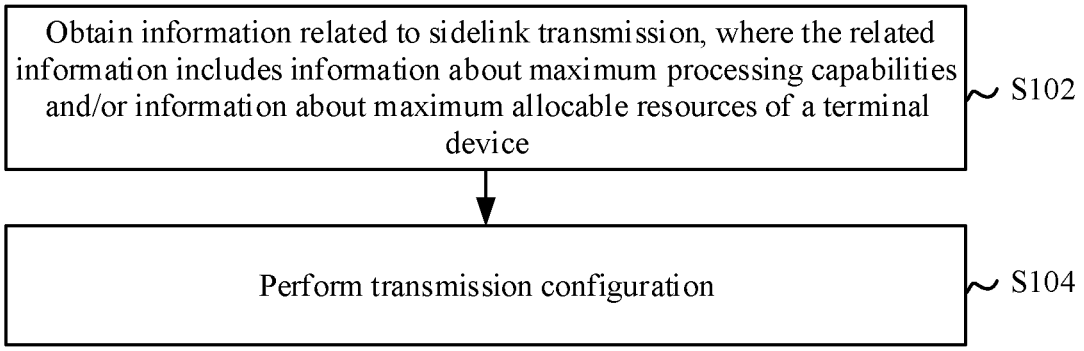
FIG. 1 is a schematic flowchart of a method for capability and resource allocation for a sidelink according to an embodiment of this disclosure.

To make the objectives, technical solutions, and advantages of this disclosure clearer, the following clearly describes the technical solutions of this disclosure with reference to specific embodiments of this disclosure and corresponding drawings. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure.

It should be understood that the technical solutions of the embodiments of this disclosure may be applied to various communications systems, such as a global system for mobile communications (Global System for Mobile communications, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communications system, a 5G system or new radio (New Radio, NR) system, or a later evolved communications system.

In the embodiments of this disclosure, a terminal device may include but is not limited to a mobile station (Mobile Station, MS), a mobile terminal (Mobile Terminal), a mobile telephone (Mobile Telephone), user equipment (User Equipment, UE), a handset (handset), portable equipment (portable equipment), a vehicle (vehicle), or the like. The terminal device may communicate with one or more core networks through a radio access network (Radio Access Network, RAN). For example, the terminal device may be a mobile phone (or referred to as a "cellular" phone), or a computer having a wireless communication function. Alternatively, the terminal device may be a portable, pocket-sized, handheld, computer built-in, or in-vehicle mobile apparatus.

In the embodiments of this disclosure, a network device is an apparatus deployed in the radio access network and configured to provide a wireless communication function for the terminal device. The network device may be a base station. The base station may include a macro base station, a micro base station, a relay station, an access point, and the like in various forms. Devices having base station functions may have different names in systems using different radio access technologies, for example, an evolved NodeB (Evolved NodeB, eNB or eNodeB) in an LTE network, a NodeB (NodeB) in a 3rd Generation (3rd Generation, 3G) network, or a network device in a later evolved communications system. However, the terms do not constitute any limitation.

As shown in FIG. 1, an embodiment of this disclosure provides a method 100 for capability and resource allocation for a sidelink. The method may be performed by a terminal device and includes the following steps.

S102. Obtain information related to sidelink transmission, where the related information includes information about maximum processing capabilities and/or information about maximum allocable resources of the terminal device.

Optionally, the related information includes at least one of the following:
  a quantity of hybrid automatic repeat request (Hybrid Automatic Repeat Request, HARQ) entities supported by the terminal device;
  a quantity of HARQ processes supported by the terminal device;
  a buffer size of the terminal device;
  target information that can be monitored or detected by the terminal device within a unit time, where the target information includes at least one of sidelink control information (Sidelink Control Information, SCI), a control channel, or a control channel candidate;
  a data rate supported by the terminal device;
  transmit power of the terminal device;
  a quantity of transmit/receive carriers supported by the terminal device, where the quantity may be specifically a quantity of transmit carriers and/or a quantity of receive carriers supported by the terminal device, and the same applies hereinafter;
  a quantity of transmit/receive antennas supported by the terminal device, where the quantity may be specifically a quantity of transmit antennas and/or a quantity of receive antennas supported by the terminal device, and the same applies hereinafter;
  a quantity of transmit/receive beams supported by the terminal device, where the quantity may be specifically a quantity of transmit beams and/or a quantity of receive beams supported by the terminal device, and the same applies hereinafter;
  a quantity of transmit/receive resource pools supported by the terminal device, where the quantity may be specifically a quantity of transmit resource pools and/or a quantity of receive resource pools supported by the terminal device, and the same applies hereinafter;
  a transmission mode supported by the terminal device, for example, an LTE SL and/or an NR SL supported by the terminal device;
  a quantity of sidelink connections supported by the terminal device; or
  a quantity of subcarrier spacings (Subcarrier Spacing, SCS) that can be monitored or demodulated by the terminal device within a unit time, or the like.

S104. Perform transmission configuration.

Optionally, the step may be specifically: performing transmission configuration based on the related information, that is, the terminal device performs transmission configuration based on the information about the maximum processing capabilities and/or the information about the maximum allocable resources of the terminal device, or the terminal device may directly perform transmission configuration for the sidelink transmission without considering the related information.

When transmission configuration is performed in step S104, specifically, at least one of the following six modes may be used:
  (1) performing transmission configuration between different transmission types of the sidelink transmission, where for example, the terminal device allocates processing capabilities and resources between the different transmission types such as broadcast, multicast/groupcast, or unicast;
  (2) performing transmission configuration between different resource pools of the sidelink transmission, where the different resource pools include, for example, a default/initial/first resource pool, an exceptional resource pool, and a dedicated resource pool, and the terminal device may allocate processing capabilities and resources between the different resource pools;
  (3) performing transmission configuration between different services of the sidelink transmission, where the different services include, for example, a security service, a basic V2X service, an advanced V2X service, and periodic and aperiodic services, and the terminal device may allocate processing capabilities and resources between the different services;
  (4) performing transmission configuration in different connection statuses of the sidelink transmission, where for example, when establishing a connection for the sidelink transmission (unicast or multicast), the terminal device negotiates processing capabilities and resources to be allocated to the sidelink connection; for another example, when transmitting data on the sidelink, the terminal device allocates capabilities and resources used for the sidelink transmission; for another example, in a connection process of the sidelink transmission, the terminal device manages processing capabilities and resources used for the sidelink transmission; and the performing configuration in different connection statuses includes performing transmission configuration between different unicast connections;

(5) performing transmission configuration between different transmission modes of the sidelink transmission, where for example, the terminal device allocates processing capabilities and resources between LTE and NR; or (6) performing transmission configuration between different transmit/receive beams of the sidelink transmission, where for example, the terminal device allocates processing capabilities and resources on different beams, and the processing capabilities and resources may be specifically a quantity of transmit/receive carriers, a quantity of target information to be monitored or detected, power, or the like.

The processing capabilities and resources in related information used for transmission under the foregoing different transmission types and/or different connection statuses are not beyond the maximum processing capabilities and the maximum allocable resources of the terminal device.

This embodiment of this disclosure shows a specific implementation of the foregoing step S104 herein. It should be understood that step S104 may also be implemented in another manner. This is not limited in this embodiment of this disclosure.

In the method for capability and resource allocation for a sidelink according to this embodiment of this disclosure, the information about the maximum processing capabilities and/or the information about the maximum allocable resources of the terminal device can be obtained, and transmission configuration can be performed. Therefore, during sidelink transmission, processing capabilities or resources of the terminal device can be allocated to improve effectiveness of communication.

In addition, in the method for capability and resource allocation for a sidelink according to this embodiment of this disclosure, processing capabilities and resources of the terminal device can be allocated flexibly and dynamically, so that implementation complexity of the terminal device and device costs can be further reduced while a plurality of advanced SL transmission modes are supported.

To reduce implementation complexity of a terminal device and device costs, in the related art, on a Uu interface (that is, downlink and uplink) between a network device and a terminal device, one terminal device only needs to establish a unicast connection to one network device. Therefore, only one HARQ entity (HARQ entity) needs to be established on one carrier or cell. A single HARQ entity supports a maximum of 16 processes, and the terminal device needs to reserve a corresponding buffer (soft buffer) size. In an LTE SL, communication is performed based on broadcast. The terminal device does not establish a point-to-point connection on a physical layer. Only one HARQ entity needs to be established on one carrier. When the terminal device performs communication or transmission on the SL, a single HARQ entity supports a maximum of 8 processes. In an NR SL system, if a terminal device supports establishment of unicast or multicast/groupcast connections to a plurality of other terminal devices, according to the related art, the terminal device needs to reserve resources for each connection, to ensure that a corresponding quality of service (Quality of Service, QoS) requirement can be satisfied. In comparison with the Uu interface, this greatly increases implementation complexity of the terminal device and device costs. In the method for capability and resource allocation for a sidelink according to this embodiment of this disclosure, processing capabilities and resources of the terminal device can be allocated flexibly and dynamically, so that the implementation complexity of the terminal device and device costs can be reduced while a plurality of advanced SL transmission modes are supported.

The method for capability and resource allocation for a sidelink according to this embodiment of this disclosure is applicable to a specific public safety affair (for example, emergency communication on a fire site or a disaster site such as an earthquake), vehicle to everything (vehicle to everything, V2X) communication, or the like. Vehicle to everything communication includes various services, for example, basic security communication, advanced driving (self-driving), platooning, sensor extension, and advanced V2X services.

The method for capability and resource allocation for a sidelink according to this embodiment of this disclosure may be not only applicable to systems such as 802.11p and dedicated short range communications (Dedicated Short Range Communications, DSRC), but also applicable to later evolved systems.

Optionally, after obtaining the information related to sidelink transmission in the foregoing S102 of this embodiment, the terminal device may further transmit the related information to a network device, so that the network device performs transmission configuration or scheduling.

Alternatively, the terminal device may further transmit the related information to a target terminal device, so that the target terminal device performs transmission configuration or scheduling.

Optionally, the performing transmission configuration in the foregoing step S104 of this embodiment includes at least one of the following:

when establishing a connection for the sidelink transmission, negotiating related information used for the sidelink transmission;

when transmitting data on the sidelink, allocating related information used for the sidelink transmission; or in a connection process of the sidelink transmission, managing related information used for the sidelink transmission.

An occasion of performing transmission configuration is described herein.

This transmission configuration mode may be combined freely with the six transmission configuration modes (1) to (6) mentioned in the foregoing descriptions of this embodiment.

Optionally, the negotiating related information used for the sidelink transmission includes: transmitting the related information used for the sidelink transmission. For example, when initiating request information for establishing a sidelink connection for the sidelink transmission, the terminal device suggests the maximum processing capabilities and resources for the sidelink connection. Specifically, the request information may include the maximum processing capabilities and resources suggested by the terminal device for the sidelink connection. Therefore, when a peer device receives the request information from the terminal device, the peer device may agree to the request information based on the related information. Alternatively, when available values of the related information of the terminal device are insufficient, the maximum processing capabilities and resources corresponding to the connection are negotiated, or the request information is rejected.

Optionally, the negotiating related information used for the sidelink transmission may further include: receiving request information used for establishing a sidelink connection for the sidelink transmission, where the request information includes related information that a peer device suggests for the sidelink transmission; and responding to the request information.

Specifically, when responding to the request information of the peer device, the terminal device may negotiate, feed back, or respond to the maximum processing capabilities and resources corresponding to the connection. The responding to the request information includes: establishing a sidelink connection to the peer device; or when available values of the related information of the terminal device are insufficient, refusing to reestablish a sidelink connection to the peer device.

Optionally, the performing transmission configuration in the foregoing step S104 of this embodiment includes: when establishing a connection for the sidelink transmission, or when transmitting data on the sidelink, determining, based on first target quality of service (Quality of Service, QoS) information and/or radio resource information, related information used for the sidelink transmission. The radio resource information includes, for example, channel usage, or radio channel interference.

Optionally, the managing related information used for the sidelink transmission includes: activating or deactivating all the related information used for the sidelink transmission; or activating or deactivating a part of the related information used for the sidelink transmission. Therefore, the terminal device can share processing capabilities and resources dynamically among a plurality of connections.

Optionally, the managing related information used for the sidelink transmission may further include: reallocating or renegotiating related information used for the sidelink transmission. Specifically, the terminal device may reallocate or renegotiate, based on at least one of service requirement information or second target quality of service QoS information, the related information used for the sidelink transmission. Specifically, the terminal device may request more processing capabilities and resources.

To describe in detail the method for capability and resource allocation for a sidelink according to this disclosure, the following describes the method with reference to three specific embodiments.

Embodiment 1

By obtaining information related to sidelink transmission, UE 1 determines to support a maximum of 32 HARQ processes and support a maximum of 40 control channels to be detected within a unit time.

By obtaining information related to sidelink transmission, UE 2 determines to support a maximum of 16 HARQ processes and support a maximum of 10 control channels to be detected within a unit time.

Optionally, when performing transmission configuration, the UE 1 and the UE 2 may respectively allocate two HARQ processes for broadcast.

Optionally, when performing transmission configuration, the UE 1 and the UE 2 may further respectively allocate two HARQ processes for multicast.

Optionally, when performing transmission configuration, the UE 1 and the UE 2 may further establish an SL unicast connection, and negotiate allocation of processing capabilities and resources based on quality of service QoS. Details are as follows:

(a) The UE 1 may transmit request information to the UE 2, requesting to establish an SL unicast connection, where the request information includes a quantity of HARQ processes and a quantity of control channels to be detected that are suggested for use. For example, the UE 1 suggests using 16 HARQ processes and 20 control channels to be detected.

(b) The UE 2 responds to the request information of the UE 1, negotiates eight HARQ processes (for example, because the UE 2 has established a unicast connection to other UE currently) and four control channels to be detected. Therefore, there are eight HARQ processes for establishing the SL unicast connection between the UE 1 and the UE 2, and there are four control channels to be detected.

Optionally, during subsequent transmission of the UE 1 and the UE 2, due to a QoS change (for example, due to an application layer service requirement), the UE 2 may initiate, to the UE 1, reallocation or renegotiation about processing capabilities and resources to be allocated to the sidelink connection. For example, the UE 2 requests to modify the quantity of HARQ processes to 12. Correspondingly, the UE 1 may agree to the modification request of the UE 2.

In the method for capability and resource allocation for a sidelink according to this embodiment of this disclosure, processing capabilities and resources of the terminal device can be allocated flexibly and dynamically, so that implementation complexity of the terminal device and device costs can be reduced while a plurality of advanced SL transmission modes are supported.

It should be noted that Embodiment 1 only uses the quantity of HARQ processes and the quantity of control channels to be detected as an example for describing the processing capabilities and resources of the terminal device. For other processing capabilities and resources of the terminal device, the foregoing Embodiment 1 is also applicable.

Embodiment 2

By obtaining information related to sidelink transmission, UE 1 determines to support a maximum of 32 HARQ processes and support a maximum of 40 control channels to be detected within a unit time.

By obtaining information related to sidelink transmission, UE 2 determines to support a maximum of 8 HARQ processes and support a maximum of 10 control channels to be detected within a unit time.

Optionally, the UE 1 and the UE 2 may report the quantities of SL HARQ processes and the quantities of control channels to be detected that are supported by the UE 1 and the UE 2 to the network device, so that the network device performs transmission configuration or scheduling.

For example, the UE 1 may transmit request information to the network device, requesting to establish an SL unicast connection to the UE 2.

The network device may allocate and schedule resources for the UE 1 and the UE 2 for SL transmission and reception, and ensure that the resources are not beyond maximum processing capabilities and resources of the UE 1 and the UE 2.

Specifically, for example, parallel transmission HARQ processes allocated by the network device to the UE 1 and the UE 2 are not beyond maximum quantities of HARQ processes supported by the UE 1 and the UE 2, and quantities of SL control channels to be monitored by the UE 1 and the UE 2 are not beyond maximum quantities of control channels to be detected that are supported by the UE 1 and the UE 2.

In the method for capability and resource allocation for a sidelink according to this embodiment of this disclosure, processing capabilities and resources of the terminal device can be allocated flexibly and dynamically, so that implementation complexity of the terminal device and device costs can be reduced while a plurality of advanced SL transmission modes are supported.

It should be noted that Embodiment 2 only uses the quantity of HARQ processes and the quantity of control channels to be detected as an example for describing the processing capabilities and resources of the terminal device. For other processing capabilities and resources of the terminal device, the foregoing Embodiment 2 is also applicable.

In addition, in Embodiment 2, the network device is used as a scheduling node, and Embodiment 2 is also applicable to a scenario in which another UE (UE 3) allocates and schedules resources for the UE 1 and the UE 2.

Embodiment 3

By obtaining information related to sidelink transmission, UE 1 determines to support a maximum of 32 HARQ processes and support a maximum of 40 control channels to be detected within a unit time.

By obtaining information related to sidelink transmission, UE 2 determines to support a maximum of 16 HARQ processes and support a maximum of 20 control channels to be detected within a unit time.

Optionally, when performing transmission configuration, the UE 1 and the UE 2 establish an SL unicast connection, and negotiate allocation of processing capabilities and resources based on QoS, where 16 HARQ processes and 16 control channels to be detected are allocated to the unicast connection.

Optionally, the UE 2 may further dynamically adjust the quantity of HARQ processes and/or the quantity of control channels to be detected of the UE 2. For example, the UE 2 deactivates four HARQ processes and four control channels to be detected, which are temporarily allocated for other broadcast transmission.

Optionally, the UE 2 may subsequently further reactivate the four HARQ processes and four control channels to be detected for the unicast connection.

In the method for capability and resource allocation for a sidelink according to this embodiment of this disclosure, processing capabilities and resources of the terminal device can be allocated flexibly and dynamically, so that implementation complexity of the terminal device and device costs can be reduced while a plurality of advanced SL transmission modes are supported.

It should be noted that Embodiment 3 only uses the quantity of HARQ processes and the quantity of control channels to be detected as an example for describing the processing capabilities and resources of the terminal device. For other processing capabilities and resources of the terminal device, the foregoing Embodiment 3 is also applicable.

Figure 2:
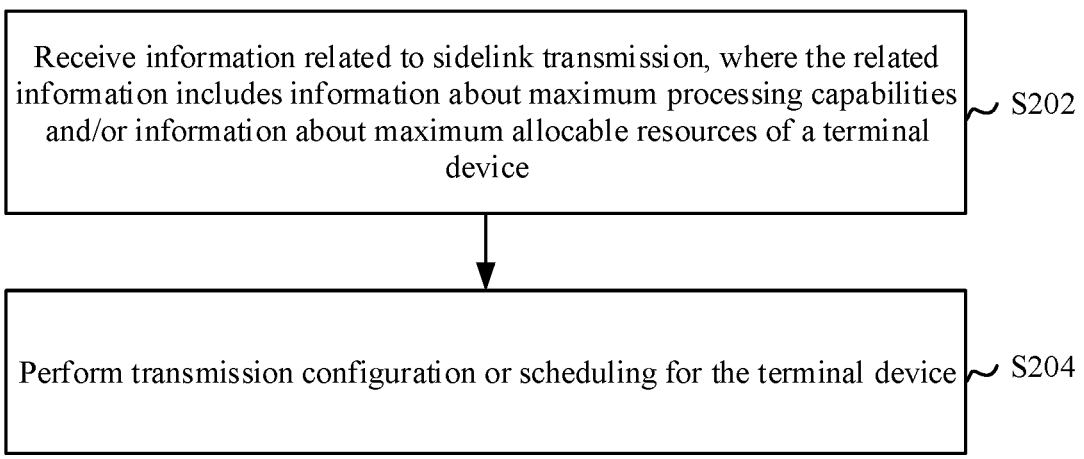
FIG. 2 is a schematic flowchart of a method for capability and resource allocation for a sidelink according to another embodiment of this disclosure.

As shown in FIG. 2, an embodiment of this disclosure provides a method 200 for capability and resource allocation for a sidelink. The method may be performed by a control device. The control device mentioned in this embodiment of this disclosure may be specifically a network device, or may be a terminal device. This embodiment includes the following steps.

S202. Receive information related to sidelink transmission, where the related information includes information about maximum processing capabilities and/or information about maximum allocable resources of a terminal device.

The related information may come from the terminal device mentioned in the embodiment shown in FIG. 1.

S204. Perform transmission configuration or scheduling for the terminal device.

The allocated or scheduled resources are not beyond the maximum processing capabilities and resources supported by the terminal device.

For other descriptions about this embodiment of this disclosure, refer to the descriptions on the terminal device side, or refer to the foregoing Embodiment 2.

In the method for capability and resource allocation for a sidelink according to this embodiment of this disclosure, the information about the maximum processing capabilities and/or the information about the maximum allocable resources of the terminal device can be obtained, and transmission configuration can be performed. Therefore, during sidelink transmission, processing capabilities or resources of the terminal device can be allocated to improve effectiveness of communication.

Optionally, the related information includes at least one of the following:
  a quantity of HARQ entities supported by the terminal device;
  a quantity of HARQ processes supported by the terminal device;
  a buffer size of the terminal device;
  target information that can be monitored or detected by the terminal device within a unit time, where the target information includes at least one of sidelink control information (Sidelink Control Information, SCI), a control channel, or a control channel candidate;
  a data rate supported by the terminal device;
  transmit power of the terminal device;
  a quantity of transmit/receive carriers supported by the terminal device;
  a quantity of transmit/receive antennas supported by the terminal device;
  a quantity of transmit/receive beams supported by the terminal device;
  a quantity of transmit/receive resource pools supported by the terminal device;
  a transmission mode supported by the terminal device, for example, an LTE SL and/or an NR SL supported by the terminal device;
  a quantity of sidelink connections supported by the terminal device; or
  a quantity of subcarrier spacings SCSs that can be monitored or demodulated by the terminal device within a unit time, or the like.

The foregoing describes the method for capability and resource allocation for a sidelink according to the embodiments of this disclosure with reference to FIG. 1 and FIG. 2. The following describes a terminal device according to an embodiment of this disclosure in detail with reference to FIG. 3.

Figure 3:
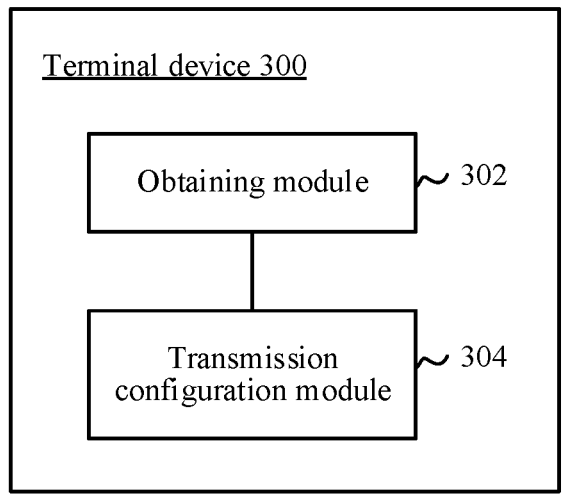
FIG. 3 is a schematic structural diagram of a terminal device according to an embodiment of this disclosure.

FIG. 3 is a schematic structural diagram of a terminal device according to an embodiment of this disclosure. As shown in FIG. 3, the terminal device 300 includes:

an obtaining module 302, configured to obtain information related to sidelink transmission, where the related information includes information about maximum processing capabilities and/or information about maximum allocable resources of the terminal device; and a transmission configuration module 304, configured to perform transmission configuration.

The terminal device provided by this embodiment of this disclosure can obtain the information about the maximum processing capabilities and/or the information about the maximum allocable resources of the terminal device, and perform transmission configuration. Therefore, during sidelink transmission, processing capabilities or resources can be allocated to improve effectiveness of communication.

The terminal device provided by this embodiment of this disclosure can allocate processing capabilities and resources of the terminal device flexibly and dynamically, so that implementation complexity of the terminal device and device costs are reduced while a plurality of advanced SL transmission modes are supported.

Optionally, in an embodiment, the related information includes at least one of the following:

a data rate supported by the terminal device;

transmit power of the terminal device;

a quantity of transmit/receive carriers supported by the terminal device;

a quantity of transmit/receive antennas supported by the terminal device;

a quantity of transmit/receive beams supported by the terminal device;

a quantity of transmit/receive resource pools supported by the terminal device;

a transmission mode supported by the terminal device, for example, an LTE SL and/or an NR SL supported by the terminal device;

a quantity of sidelink connections supported by the terminal device; or a quantity of subcarrier spacings SCSs that can be monitored or demodulated by the terminal device within a unit time, or the like.

Optionally, in an embodiment, the performing transmission configuration by the transmission configuration module 304 includes at least one of the following:

performing transmission configuration between different transmission types of the sidelink transmission, where for example, the terminal device allocates processing capabilities and resources between the different transmission types such as broadcast, multicast/groupcast, or unicast;

performing transmission configuration between different resource pools of the sidelink transmission, where the different resource pools include, for example, a default/initial/first resource pool, an exceptional resource pool, and a dedicated resource pool, and the terminal device may allocate processing capabilities and resources between the different resource pools;

performing transmission configuration between different services of the sidelink transmission, where the different services include, for example, a security service, a basic V2X service, an advanced V2X service, and periodic and aperiodic services, and the terminal device may allocate processing capabilities and resources between the different services;

performing transmission configuration in different connection statuses of the sidelink transmission, where for example, when establishing a connection for the sidelink transmission (unicast or multicast), the terminal device negotiates processing capabilities and resources to be allocated to the sidelink connection; for another example, when transmitting data on the sidelink, the terminal device allocates capabilities and resources used for the sidelink transmission; for another example, in a connection process of the sidelink transmission, the terminal device manages processing capabilities and resources used for the sidelink transmission; and the performing configuration in different connection statuses includes performing transmission configuration between different unicast connections;

performing transmission configuration between different transmission modes of the sidelink transmission, where for example, the terminal device allocates processing capabilities and resources between LTE and NR; or performing transmission configuration between different transmit/receive beams of the sidelink transmission, where for example, the terminal device allocates processing capabilities and resources on different beams, and the processing capabilities and resources may be specifically a quantity of transmit/receive carriers, a quantity of target information to be monitored or detected, power, or the like.

Optionally, in an embodiment, the performing transmission configuration by the transmission configuration module 304 includes at least one of the following:

when establishing a connection for the sidelink transmission, negotiating related information used for the sidelink transmission;

when transmitting data on the sidelink, allocating related information used for the sidelink transmission; or in a connection process of the sidelink transmission, managing related information used for the sidelink transmission.

Optionally, in an embodiment, the negotiating related information used for the sidelink transmission by the transmission configuration module 304 includes:

transmitting the related information used for the sidelink transmission. For example, when initiating request information for establishing a sidelink connection for the sidelink transmission, the terminal device suggests the maximum processing capabilities and resources for the sidelink connection. Specifically, the request information may include the maximum processing capabilities and resources suggested by the terminal device for the sidelink connection. Therefore, when a peer device receives the request information from the terminal device, the peer device may agree to the request information based on the related information. Alternatively, when available values of the related information of the terminal device are insufficient, the request information is rejected.

Optionally, in an embodiment, the negotiating related information used for the sidelink transmission by the transmission configuration module 304 includes: receiving request information used for establishing a sidelink connection for the sidelink transmission, where the request information includes related information that a peer device suggests for the sidelink transmission; and responding to the request information.

Specifically, when responding to the request information of the peer device, the terminal device may negotiate, feed back, or respond to the maximum processing capabilities and resources corresponding to the connection. The responding to the request information includes: establishing a sidelink connection to the peer device; or when available values of the related information of the terminal device are insufficient, refusing to reestablish a sidelink connection to the peer device.

Optionally, in an embodiment, the responding to the request information by the transmission configuration module 304 includes:
refusing to reestablish a sidelink connection to the peer device; or
establishing a sidelink connection to the peer device.

Optionally, in an embodiment, the performing transmission configuration by the transmission configuration module 304 includes:
when establishing a connection for the sidelink transmission, or when transmitting data on the sidelink, determining, based on first target quality of service information and/or radio resource information, related information used for the sidelink transmission. The radio resource information includes, for example, channel usage, or radio channel interference.

Optionally, in an embodiment, the managing related information used for the sidelink transmission by the transmission configuration module 304 includes:
activating or deactivating all the related information used for the sidelink transmission; or
activating or deactivating a part of the related information used for the sidelink transmission. Therefore, the terminal device can share processing capabilities and resources dynamically among a plurality of connections.

Optionally, in an embodiment, the managing related information used for the sidelink transmission by the transmission configuration module 304 includes:
reallocating or renegotiating related information used for the sidelink transmission.

Optionally, in an embodiment, the reallocating or renegotiating related information used for the sidelink transmission by the transmission configuration module 304 includes:
reallocating or renegotiating, based on at least one of service requirement information or second target quality of service information, the related information used for the sidelink transmission. Specifically, the terminal device may request more processing capabilities and resources.

Optionally, in an embodiment, the terminal device 200 further includes a transmission module, which may be configured to:
transmit the related information to a network device, so that the network device performs transmission configuration or scheduling; or
transmit the related information to a target terminal device, so that the target terminal device performs transmission configuration or scheduling.

Optionally, in an embodiment, the processing capabilities and resources in related information used for transmission under different transmission types and/or different connection statuses are not beyond the maximum processing capabilities and the maximum allocable resources of the terminal device.

For the terminal device 300 according to this embodiment of this disclosure, reference may be made to the procedure of the method 100 in the corresponding embodiment of this disclosure. In addition, the units or modules in the terminal device 300 and the foregoing other operations and/or functions are respectively intended to implement the corresponding procedures in the method 100, and details are not repeated herein for brevity.

Figure 4:
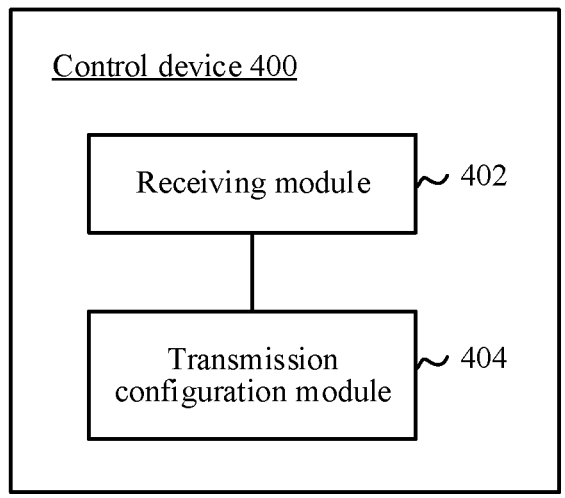
FIG. 4 is a schematic structural diagram of a control device according to an embodiment of this disclosure.

FIG. 4 is a schematic structural diagram of a control device according to an embodiment of this disclosure. As shown in FIG. 4, the control device 400 includes:
a receiving module 402, configured to receive information related to sidelink transmission, where the related information includes information about maximum processing capabilities and/or information about maximum allocable resources of a terminal device; and
a transmission configuration module 404, configured to perform transmission configuration or scheduling for the terminal device.

The allocated or scheduled resources cannot be beyond the maximum processing capabilities and resources supported by the terminal device.

The control device provided by this embodiment of this disclosure can obtain the information about the maximum processing capabilities and/or the information about the maximum allocable resources of the terminal device, and perform transmission configuration. Therefore, during sidelink transmission, processing capabilities or resources of the terminal device can be allocated to improve effectiveness of communication.

Optionally, in an embodiment, the related information includes at least one of the following:
a quantity of HARQ entities supported by the terminal device;
a quantity of HARQ processes supported by the terminal device;
a buffer size of the terminal device;
target information that can be monitored or detected by the terminal device within a unit time, where the target information includes at least one of SCI, a control channel, or a control channel candidate;
a data rate supported by the terminal device;
transmit power of the terminal device;
a quantity of transmit/receive carriers supported by the terminal device;
a quantity of transmit/receive antennas supported by the terminal device;
a quantity of transmit/receive beams supported by the terminal device;
a quantity of transmit/receive resource pools supported by the terminal device;
a transmission mode supported by the terminal device, for example, an LTE SL and/or an NR SL supported by the terminal device;
a quantity of sidelink connections supported by the terminal device; or
a quantity of subcarrier spacings SCSs that can be monitored or demodulated by the terminal device within a unit time, or the like.

For the control device 400 according to this embodiment of this disclosure, reference may be made to the procedure of the method 200 in the corresponding embodiment of this disclosure. In addition, the units or modules in the control device 400 and the foregoing other operations and/or functions are respectively intended to implement the corresponding procedures in the method 200, and details are not repeated herein for brevity.

Figure 5:
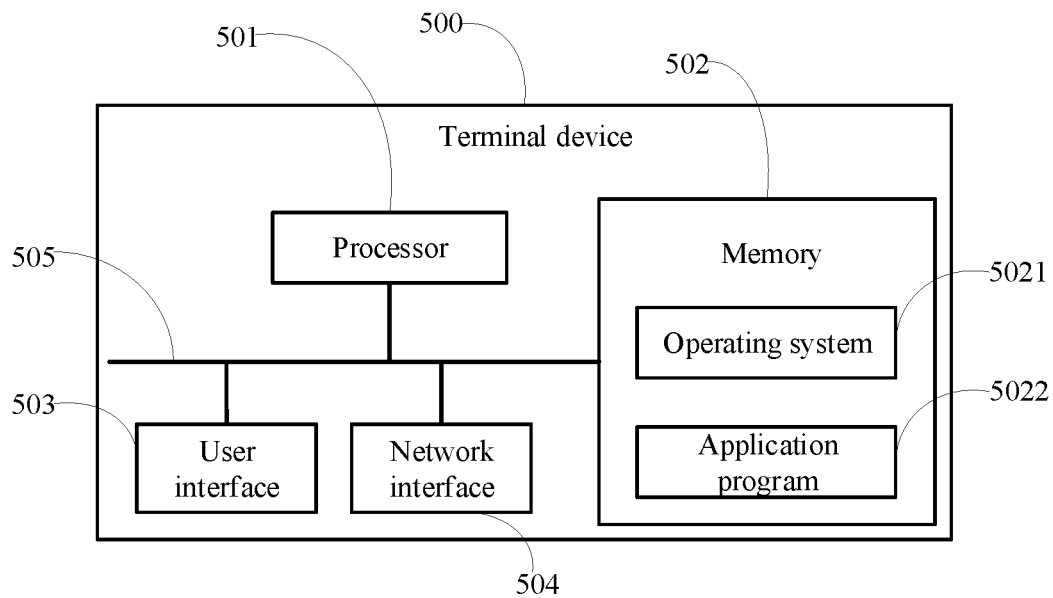
FIG. 5 is a schematic structural diagram of a terminal device according to another embodiment of this disclosure.

FIG. 5 is a block diagram of a terminal device according to another embodiment of this disclosure. The terminal device 500 shown in FIG. 5 includes at least one processor 501, a memory 502, at least one network interface 504, and a user interface 503. The components of the terminal device 500 are coupled together by using a bus system 505. It can be understood that the bus system 505 is configured to implement connection and communication between these components. The bus system 505 further includes a power bus, a control bus, and a status signal bus, in addition to a data bus. However, for clarity of description, various buses are marked as the bus system 505 in FIG. 5.

The user interface 503 may include a display, a keyboard, a pointing device (for example, a mouse or a trackball (trackball)), a touch panel or a touchscreen, or the like.

It can be understood that the memory 502 in this embodiment of this disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. For illustrative rather than limitative description, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 502 in the system and method described in this embodiment of this disclosure is intended to include but is not limited to these and any other suitable types of memories.

In some implementations, the memory 502 stores the following elements: an executable module or a data structure, or a subset thereof, or an extended set thereof: an operating system 5021 and an application program 5022.

The operating system 5021 includes various system programs, such as a framework layer, a kernel library layer, and a driver layer, for implementing various basic services and processing hardware-based tasks. The application program 5022 includes various application programs, such as a media player (Media Player) and a browser (Browser), and is configured to implement various application services. A program for implementing a method in an embodiment of this disclosure may be included in the application program 5022.

In this embodiment of this disclosure, the terminal device 500 further includes a computer program stored in the memory 502 and capable of running on the processor 501. When the computer program is executed by the processor 501, steps of the method embodiment 100 or the method embodiment 200 are implemented.

The method disclosed by the foregoing embodiment of this disclosure may be applied to the processor 501, or implemented by the processor 501. The processor 501 may be an integrated circuit chip with a signal processing capability. In an implementation process, the steps of the foregoing method may be implemented by an integrated logic circuit of hardware in the processor 501, or by a software instruction. The processor 501 may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, steps, and logical block diagrams that are disclosed in the embodiments of this disclosure. The general-purpose processor may be a microprocessor, or the processor may be any conventional processor or the like. Steps of the methods disclosed with reference to the embodiments of this disclosure may be directly performed and completed by using a hardware decoding processor, or may be performed and completed by using a combination of hardware and a software module in a decoding processor. The software module may be located in a mature computer-readable storage medium in the art, such as a random access memory, a flash memory, a read-only memory, a programmable read-only memory, an electrically erasable programmable memory, or a register. The computer-readable storage medium is located in the memory 502. The processor 501 reads information from the memory 502 and performs steps of the foregoing method in combination with hardware of the processor. Specifically, the computer-readable storage medium stores a computer program. When the computer program is executed by the processor 501, steps of the method embodiment 100 or the method embodiment 200 are implemented.

It can be understood that the embodiments described in the embodiments of this disclosure may be implemented by hardware, software, firmware, middleware, microcode, or a combination thereof. For hardware implementation, the processing unit may be implemented in one or more application specific integrated circuits (Application Specific Integrated Circuits, ASIC), digital signal processors (Digital Signal Processor, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, and other electronic units for performing the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in or outside the processor.

The terminal device 500 can implement each process implemented by the terminal device in the foregoing embodiment. To avoid repetition, details are not described again herein.

Figure 6:
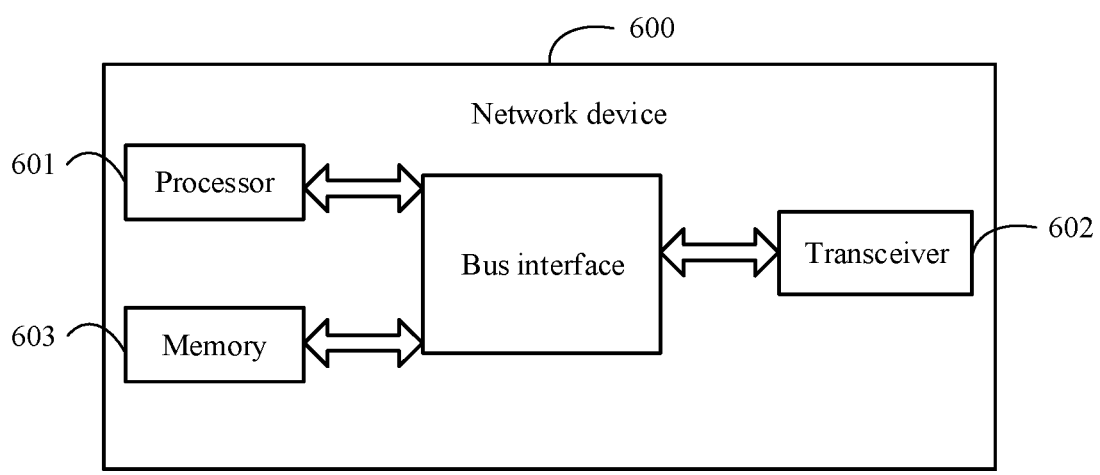
FIG. 6 is a schematic structural diagram of a network device according to another embodiment of this disclosure.

FIG. 6 is a structural diagram of a network device to which an embodiment of this disclosure is applied. The network device can implement details of the method embodiment 200, with the same effect achieved. As shown in FIG. 6, the network device 600 includes a processor 601, a transceiver 602, a memory 603, and a bus interface.

In this embodiment of this disclosure, the network device 600 further includes a computer program stored in the memory 603 and capable of running on the processor 601. When the computer program is executed by the processor 601, steps of the method 200 are implemented.

In FIG. 6, a bus architecture may include any quantity of interconnect buses and bridges, specifically for interconnecting various circuits of one or more processors represented by the processor 601 and a memory represented by the memory

603. The bus architecture may further interconnect various other circuits such as a peripheral device, a voltage regulator, and a power management circuit. These are all well known in the art, and therefore are not further described in this specification. The bus interface provides an interface. The transceiver 602 may be a plurality of components, that is, the transceiver 602 includes a transmitter and a receiver, and provides a unit for communicating with various other apparatuses on a transmission medium.

The processor 601 is responsible for bus architecture management and general processing. The memory 603 may store data used when the processor 601 performs an operation.

An embodiment of this disclosure further provides a computer-readable storage medium, where a computer program is stored in the computer-readable storage medium. When the computer program is executed by a processor, processes of the method embodiment 100 or the method embodiment 200 are implemented, with the same technical effect achieved. To avoid repetition, details are not described again herein. The computer-readable storage medium is, for example, a read-only memory (Read-Only Memory, ROM for short), a random access memory (Random Access Memory, RAM for short), a magnetic disk, or an optical disc.

It should be noted that in this specification, the term "comprising", "including", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A method for capability and resource allocation for a sidelink, wherein the method is performed by a terminal device and comprises:
   obtaining information related to sidelink transmission; wherein the related information comprises at least one of the following:
   a quantity of sidelink control information (SCI) to be monitored or detected within a unit time;
   a quantity of a control channel to be monitored or detected within a unit time; or,
   a quantity of a control channel candidate to be monitored or detected within a unit time;
   wherein the related information is information about maximum processing capabilities of the terminal device; and
   performing transmission configuration;
   wherein the performing transmission configuration comprises:
   when establishing a connection for the sidelink transmission, negotiating, with a peer device, related information used for the sidelink transmission;
   wherein the negotiating, with a peer device, related information used for the sidelink transmission comprises:
   receiving, from the peer device, request information used for establishing a sidelink connection for the sidelink transmission, wherein the request information comprises a quantity of the SCI, a quantity of the control channel and/or, a quantity of the control channel candidate to be monitored or detected within the unit time that a peer device suggests for the sidelink transmission; and
   establishing, or refusing to establish, a sidelink connection to the peer device based on the information about maximum processing capabilities of the terminal device;
   wherein establishing the sidelink connection to the peer device, comprises:
   establishing the sidelink connection to the peer device in accordance with the quantity of SCI, the quantity of the control channel and/or, the quantity of the control channel candidate to be monitored or detected within the unit time that the peer device suggests for the sidelink transmission complying with the information about maximum processing capabilities of the terminal device;
   wherein refusing to establish the sidelink connection to the peer device, comprises:
   refusing to establish the sidelink connection to the peer device in accordance with that the quantity of SCI, the quantity of the control channel and/or, the quantity of the control channel candidate to be monitored or detected within the unit time that the peer device suggests for the sidelink transmission does not comply with the information about maximum processing capabilities of the terminal device.

2. The method according to claim 1, wherein the related information further comprises at least one of the following:
   a quantity of hybrid automatic repeat request (HARQ) entities;
   a quantity of HARQ processes;
   a buffer size;
   a supported data rate;
   transmit power;
   a supported quantity of transmit/receive carriers;
   a supported quantity of transmit/receive antennas;
   a supported quantity of transmit/receive beams;
   a supported quantity of transmit/receive resource pools;
   a supported transmission mode; wherein supported transmission mode comprises an LTE sidelink and/or an NR sidelink supported by the terminal device;
   a quantity of sidelink connections; or
   a quantity of monitored or demodulated subcarrier spacings (SCSs).

3. The method according to claim 1, wherein the performing transmission configuration further comprises at least one of the following:
  performing transmission configuration between different transmission modes of the sidelink transmission;
  performing transmission configuration between different transmit/receive beams of the sidelink transmission;
  performing transmission configuration between different transmission types of the sidelink transmission;
  performing transmission configuration between different resource pools of the sidelink transmission;
  performing transmission configuration between different services of the sidelink transmission; or
  performing transmission configuration in different connection statuses of the sidelink transmission.

4. The method according to claim 1, wherein the performing transmission configuration further comprises at least one of the following:
  when transmitting data on the sidelink, allocating related information used for the sidelink transmission; or
  in a connection process of the sidelink transmission, managing related information used for the sidelink transmission.

5. The method according to claim 1, further comprising:
  transmitting the related information to a network device, so that the network device performs transmission configuration or scheduling; or
  transmitting the related information to a target terminal device, so that the target terminal device performs transmission configuration or scheduling.

6. The method according to claim 1, wherein the negotiating, with a peer device, related information used for the sidelink transmission comprises:
  transmitting the related information used for the sidelink transmission.

7. The method according to claim 1, wherein the performing transmission configuration comprises:
  when establishing a connection for the sidelink transmission, or when transmitting data on the sidelink, determining, based on first target quality of service information and/or radio resource information, related information used for the sidelink transmission.

8. The method according to claim 4, wherein the managing related information used for the sidelink transmission comprises:
  activating or deactivating all the related information used for the sidelink transmission; or
  activating or deactivating a part of the related information used for the sidelink transmission; or
  reallocating or renegotiating related information used for the sidelink transmission.

9. The method according to claim 8, wherein the reallocating or renegotiating related information used for the sidelink transmission comprises:
  reallocating or renegotiating, based on at least one of service requirement information or second target quality of service information, the related information used for the sidelink transmission.

10. The method according to claim 3, wherein
  the processing capabilities and resources in related information used for transmission under different transmission types and/or different connection statuses are not beyond the maximum processing capabilities and the maximum allocable resources of the terminal device.

11. A terminal device, comprising a memory, a processor, and a program stored in the memory and capable of running on the processor, the program is executed by the processor to implement:
  obtaining information related to sidelink transmission; wherein the related information comprises at least one of the following:
  a quantity of sidelink control information (SCI) to be monitored or detected within a unit time;
  a quantity of a control channel to be monitored or detected within a unit time; or, a quantity of a control channel candidate to be monitored or detected within a unit time;
  wherein the related information is information about maximum processing capabilities of the terminal device; and
  performing transmission configuration;
  wherein the performing transmission configuration comprises at least one of the following:
  when establishing a connection for the sidelink transmission, negotiating, with a peer device, used for the sidelink transmission;
  wherein the negotiating, with a peer device, related information used for the sidelink transmission comprises:
  receiving, from the peer device, request information used for establishing a sidelink connection for the sidelink transmission, wherein the request information comprises a quantity of the SCI, a quantity of the control channel and/or, a quantity of the control channel candidate to be monitored or detected within the unit time that a peer device suggests for the sidelink transmission; and
  establishing, or refusing to establish, a sidelink connection to the peer device based on the information about maximum processing capabilities of the terminal device;
  wherein establishing the sidelink connection to the peer device, comprises:
  establishing the sidelink connection to the peer device in accordance with the quantity of SCI, the quantity of the control channel and/or, the quantity of the control channel candidate to be monitored or detected within the unit time that the peer device suggests for the sidelink transmission complying with the information about maximum processing capabilities of the terminal device;
  wherein refusing to establish the sidelink connection to the peer device, comprises:
  refusing to establish the sidelink connection to the peer device in accordance with that the quantity of SCI, the quantity of the control channel and/or, the quantity of the control channel candidate to be monitored or detected within the unit time that the peer device suggests for the sidelink transmission does not comply with the information about maximum processing capabilities of the terminal device.

12. The terminal device according to claim 11, wherein the related information further comprises at least one of the following:
  a quantity of hybrid automatic repeat request (HARQ) entities;
  a quantity of HARQ processes;
  a buffer size;
  a supported data rate;
  transmit power;
  a supported quantity of transmit/receive carriers;
  a supported quantity of transmit/receive antennas;

a supported quantity of transmit/receive beams;
a supported quantity of transmit/receive resource pools;
a supported transmission mode; wherein supported transmission mode comprises an LTE sidelink and/or an NR sidelink supported by the terminal device;
a quantity of sidelink connections; or
a quantity of monitored or demodulated subcarrier spacings (SCSs).

13. The terminal device according to claim 11, wherein the performing transmission configuration further comprises at least one of the following:
when transmitting data on the sidelink, allocating related information used for the sidelink transmission; or
in a connection process of the sidelink transmission, managing related information used for the sidelink transmission.

14. The terminal device according to claim 11, the program is further executed by the processor to implement:
transmitting the related information to a network device, so that the network device performs transmission configuration or scheduling; or
transmitting the related information to a target terminal device, so that the target terminal device performs transmission configuration or scheduling.

15. A non-transitory computer-readable storage medium, wherein the non-transitory computer-readable storage medium stores a program, and the program is executed by a processor to implement the method for capability and resource allocation for a sidelink according to claim 1.

16. The non-transitory computer-readable storage medium according to claim 15, wherein the related information further comprises at least one of the following:
a quantity of hybrid automatic repeat request (HARQ) entities;
a quantity of HARQ processes;
a buffer size;
a supported data rate;
transmit power;
a supported quantity of transmit/receive carriers;
a supported quantity of transmit/receive antennas;
a supported quantity of transmit/receive beams;
a supported quantity of transmit/receive resource pools;
a supported transmission mode; wherein supported transmission mode comprises an LTE sidelink and/or an NR sidelink supported by the terminal device;
a quantity of sidelink connections; or
a quantity of monitored or demodulated subcarrier spacings (SCSs).

17. The non-transitory computer-readable storage medium according to claim 15, wherein the performing transmission configuration further comprises at least one of the following:
when transmitting data on the sidelink, allocating related information used for the sidelink transmission; or
in a connection process of the sidelink transmission, managing related information used for the sidelink transmission.

18. The non-transitory computer-readable storage medium according to claim 15, the program is further executed by a processor to implement:
transmitting the related information to a network device, so that the network device performs transmission configuration or scheduling; or
transmitting the related information to a target terminal device, so that the target terminal device performs transmission configuration or scheduling.

19. A method for capability and resource allocation for a sidelink, wherein the method is performed by a terminal device and comprises:
obtaining information related to sidelink transmission; wherein the related information comprises information about maximum processing capabilities of the terminal device and information about maximum processing capabilities of a peer device; wherein the related information comprises at least one of the following:
a quantity of sidelink control information (SCI) to be monitored or detected within a unit time; a quantity of a control channel to be monitored or detected within a unit time; or, a quantity of a control channel candidate to be monitored or detected within a unit time; and
when establishing a connection for the sidelink transmission, negotiating, with the peer device, related information used for the sidelink transmission;
wherein the negotiating, with the peer device, related information used for the sidelink transmission comprises:
sending, to the peer device, request information used for establishing a sidelink connection for the sidelink transmission, wherein the request information comprises a quantity of the SCI, a quantity of the control channel and/or, a quantity of the control channel candidate to be monitored or detected within the unit time that the terminal device suggests for the sidelink transmission;
receiving, from the peer device, a quantity of the SCI, a quantity of the control channel and/or, a quantity of the control channel candidate to be monitored or detected within the unit time used for the sidelink transmission determined by the peer device; and
establishing the sidelink connection to the peer device.

* * * * *